(12) United States Patent
Schwert

(10) Patent No.: US 6,374,862 B1
(45) Date of Patent: Apr. 23, 2002

(54) TUBING FOR LINING PIPES AND METHOD FOR PRODUCING THE SAME

(76) Inventor: Siegfried Schwert, Hultenweg 16, Berlin D-14195 (DE)

( * ) Notice: Subject to any disclaimer, the term of this patent is extended or adjusted under 35 U.S.C. 154(b) by 0 days.

(21) Appl. No.: 09/807,768

(22) PCT Filed: Oct. 22, 1999

(86) PCT No.: PCT/EP99/08011

§ 371 Date: Apr. 18, 2001

§ 102(e) Date: Apr. 18, 2001

(87) PCT Pub. No.: WO00/25057

PCT Pub. Date: May 4, 2000

(30) Foreign Application Priority Data

Oct. 26, 1998 (DE) .......................... 198 50 227

(51) Int. Cl.[7] .................... F16L 58/10; F16L 55/165
(52) U.S. Cl. .................... 138/98; 138/97; 138/125; 138/137; 156/287; 156/156
(58) Field of Search .................... 138/98, 97, 137, 138/140, 141, 124, 125; 156/156, 294, 287; 95/49; 423/228, 229

(56) References Cited

U.S. PATENT DOCUMENTS

| | | | |
|---|---|---|---|
| 4,576,205 A | 3/1986 | Morinaga et al. ............. | 138/98 |
| 4,581,085 A | 4/1986 | Wood ........................... | 156/156 |
| 4,762,585 A | 8/1988 | Schneider et al. .......... | 156/294 |
| 5,407,467 A * | 4/1995 | Lokhandwala et al. ........ | 95/49 |
| 5,672,398 A | 9/1997 | Johnson ................... | 138/137 X |
| 5,762,450 A * | 6/1998 | Schmager ..................... | 138/97 |
| 5,771,940 A | 6/1998 | Iorio et al. ................... | 138/146 |
| 5,857,494 A * | 1/1999 | Tsukamoto et al. ......... | 138/124 |
| 5,882,453 A * | 3/1999 | Stark .......................... | 156/292 |
| 5,931,199 A * | 8/1999 | Kittson et al. .............. | 138/124 |
| 6,334,922 B1 * | 1/2002 | Tanaka et al. ................ | 118/35 |

FOREIGN PATENT DOCUMENTS

| | | |
|---|---|---|
| BE | 886312 | 5/1981 |
| CH | 675287 | 9/1990 |
| GB | 1569675 | 6/1980 |

* cited by examiner

*Primary Examiner*—Patrick Brinson
(74) *Attorney, Agent, or Firm*—Brinks Hofer Gilson & Lione

(57) ABSTRACT

The invention relates to a tubing arrangement for lining pipes, to a method for producing the same and to a method for lining pipes. The invention especially relates to super-pressure pipes with an internal working pressure of greater than 16 bar. In order to prevent the pipe tubing from being damaged in the case of accidents or when the pipes are placed out of service, the tubing (1) has a barrier layer (1b) which has a gas permeation of less than 1 ml/(bar d m$^2$) for nonpolar gases and of less than 0.1 ml/(bar d m$^2$) for polar gases. Preferably, the gas permeation ranges from 0.0001 ml/(bar d m$^2$) to 0.01 ml/(bar d m$^2$).

36 Claims, 2 Drawing Sheets

TUBING FOR LINING PIPES AND METHOD FOR PRODUCING THE SAME

BACKGROUND OF THE INVENTION

Figure 1:
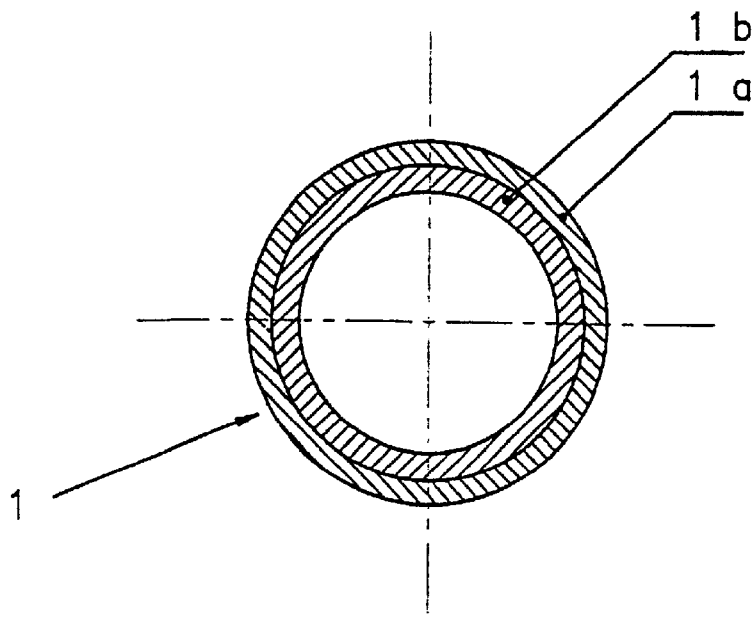
Figure 1:
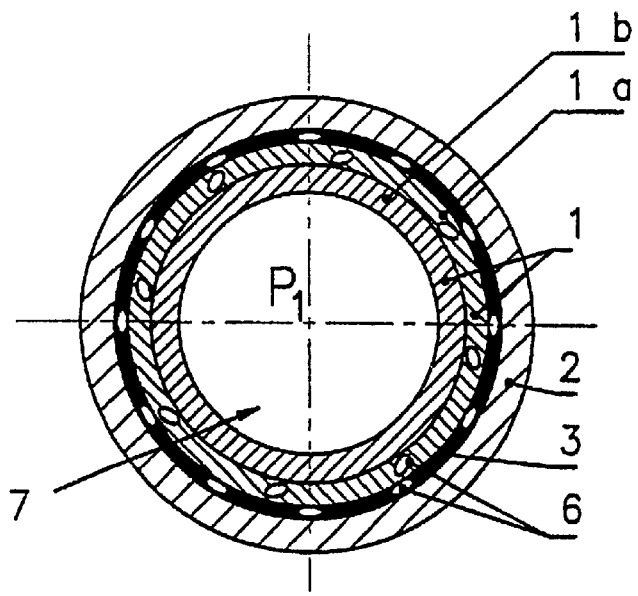

The present invention relates to an arrangement comprising a pipe and tubing lining same, and a method of producing this arrangement. The main field of application is in pipelines in which a fluid, e.g. natural gas, is transported under high pressure.

There is a known method of introducing externally coated tubing for lining a pipe with an aperture at the beginning of the pipe by inversion into this pipe, the external surface of the tubing being inverted and glued to the inner wall of the pipe to be lined. The tubing can however also be introduced into a pipe by being pulled in (without being inverted) and then glued.

The types of tubing previously used for this purpose consist mainly of a the coating. Thus pores, which are located in the adhesive itself or within the textile structure which is not completely saturated with adhesive, have the same pressure applied to them as prevails in the lined pipe.

As long as the operating pressure is maintained, as a result of the balance of pressures no damage is to be expected, but some will probably occur with a sudden drop in pressure, e.g. where there is an accident to the pipe or some other operational failures, but even also at times when the pipe is taken out of service as planned. In this case, the complete operating pressure continues to be found in the pores described previously, since this pressure cannot suddenly escape via the coating towards the centre of the pipe, i.e. the flow area of the fluid to be transported with the pipe. Whilst in the region between the inner pipe wall and the coating, the operating pressure of the superpressure pipe continues to be maintained, in the flow area there is e.g. only atmospheric pressure. As a result of this just low counter pressure, there are then expansion processes of the gases trapped in the pores, which are connected with bursting of the tubing (formation of bulges) or even complete tearing of the tubing sheath from the pipe wall.

From BE 886 312 A is already known tubing for transporting hot liquids, especially hot water. In order to prevent damage to the tubing material, in particular an increase in permeability by the hot liquids during operation, the interior of the tubing is lined with an aluminium layer which is impermeable to the liquids.

The object underlying the present invention is to make available an arrangement comprising a pipe and tubing lining same and a corresponding manufacturing method, in which when there is a drop in pressure in the flow area, damage to the lining and the safety and cost risks connected therewith do not arise.

This object is accomplished in relation to the arrangement by patent claim 1 and in relation to the manufacturing method by patent claim 19.

Because there is associated with the tubing blank a barrier layer which has a permeation of less than 1 ml/(bar d m$^2$) for nonpolar gaseous substances and a permeation of less than 0.1 ml/(bar d m$^2$) for polar gaseous substances (d=day), the penetration of the tubing by gases is prevented from the beginning or the diffusion of gases into the space between the pipe inner wall and the flow area is slowed down in such a way that even after many years in continuous service, e.g. 50 years, a sudden drop in pressure in the interior of the tubing would not cause any damage to the lining.

Advantageous developments of the present invention are given in the dependent patent claims.

A barrier layer is preferred in which the permeation of nonpolar and polar gaseous substances is in the range between 0.0001 ml/(bar d m$^2$) and 0.01 ml/(bar d m$^2$).

A particularly advantageous embodiment of the tubing provides for it to be realised as a tubing composite, i.e. multilayer, one layer being configured as the barrier layer. This makes it possible for conventional woven hoses, which have been otherwise coated according to prior art in an extruder with thermoplastic plastics materials and have an inadequate diffusion resistance, also to continue to be used for the tubing. The partitioning effect of the tubing is caused in this embodiment merely by the barrier layer.

The barrier layer consists advantageously of metal, especially aluminium, titanium, copper, iron, zinc, nickel, lead, chromium or iron-zinc and lead-tin alloys. The barrier layer preferably has a thickness of between 10 and 100 $\mu$m.

Other suitable materials for the barrier layer are organic substances such as polyvinyl alcohols (PVA) and copolymers of same, liquid crystal polymers (LCP), polyamides (PA), polyacrylonitrile, polyvinylidene-chloride (PVDC), epoxy resins (EP) or organosilicon compounds and inorganic substances such as silicon oxide (SiO$_x$ with x=2) or aluminium oxide (Al$_2$O$_3$). It is even possible, in order to reduce the gas permeation, to produce a barrier layer, applied possibly by extrusion, from a thermoplastic plastics material which is intermixed with aluminium particles.

To protect the barrier layer against abrasion or detachment, it can be provided on its radially inner side with a protective layer which is applied for example by extrusion or by dip coating. Suitable as materials for such a protective layer, for gas pipelines and in some cases for high-pressure waste water pipelines, are in particular polyurethane, especially in its realisation as thermoplastic polyurethane elastomer (TPU) and polyester, especially in its realisation as thermoplastic polyether ester elastomer (TPE), and for drinking water, service water, long-distance heating and in some cases high-pressure waste water pipelines, polyolefins including polyethylene (PE) and copolymers of ethylene and other α-olefins and thermoplastic polyolefin elastomers (TPO), thermoplastic styrene-butadiene or styrene-ethylene-propylene copolymers (TPS) and mi inner surface is wrapped.

A further advantageous development of the manufacturing method provides for a tubing blank, possibly an uncoated woven hose according to prior art, to be drawn over a tubular sheath with low gas permeation and forming a barrier layer, or be pulled into same. If the tubing blank is drawn over the tubular sheath, formed for example from aluminium foil, the tubing thus produced can be pulled into a pipe. If on the other hand the tubing is to be introduced into the pipe by an inversion method, it is advantageous to pull the tubing blank into the tubular sheath, possibly formed from aluminium foil or some other material with low gas permeation.

Yet a further advantageous embodiment provides for first of all the pipe to be lined with a tubing blank, having a gas permeation of more than 1 ml/(bar d m$^2$) for polar and nonpolar gaseous substances, and thereafter for the barrier layer to be applied to the inner surface of the tubing blank. By this means, the tubing is only completed during the lining process, such that prior assembly of the tubing is not necessary but just takes place on the building site. The tubing blank must however not exceed a specific gas permeation since possibly for the inversion and gluing to the inner pipe wall under the action of pressure, a minimum impermeability of the tubing blank is necessary.

In this connection it is particularly advantageous if the barrier layer is sprayed on in a liquid state.

This method makes it possible to adjust the thickness of the barrier layer in a cost-optimising manner to the respective nominal operating pressure in the pipe and to a desired service life of the pipe lining.

Further advantageous embodiments are given in the remaining subordinate claims.

Figure 2:
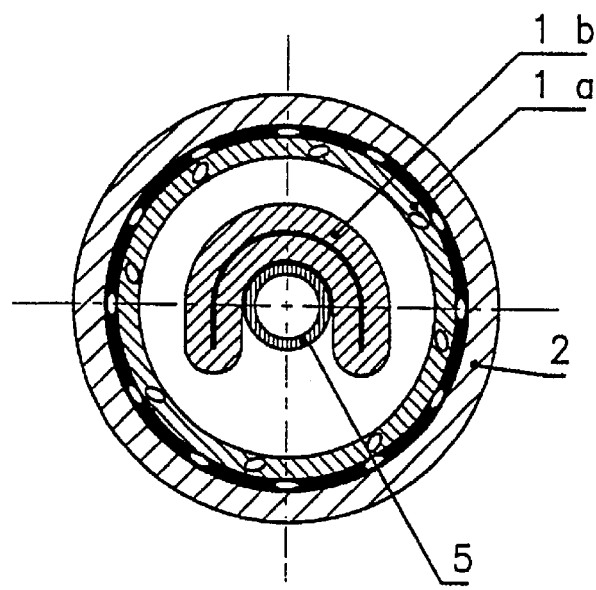
Figure 3:
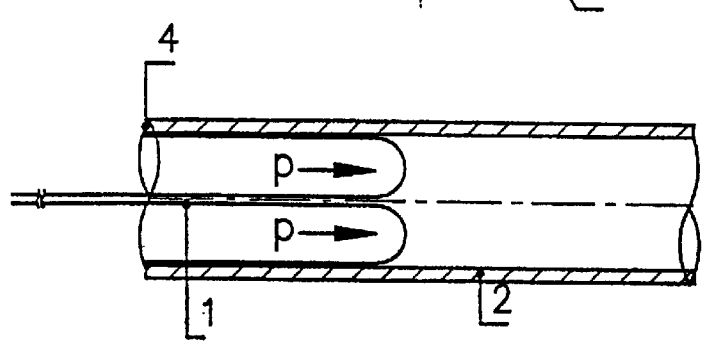

The present invention is now explained with the aid of a number of figures. They show:

FIG. 1a the cross-section of tubing according to the invention in the arrangement according to the invention, FIG. 1b the cross-section of an arrangement according to the invention, FIG. 2 pulling a tubular sheath into a pipe using a drawing-in aid, FIG. 3 a schematic representation of the process of lining by means of an inversion method.

FIG. 1a shows tubing 1 which comprises a tubing blank 1a and a barrier layer lying inside.

The tubing blank 1a of the tubing 1 is securely connected to the barrier layer 1b of the tubing. The tubing blank consists of a textile woven fabric. It is naturally possible also to provide a textile knitted fabric or some other textile structure, it being advantageous for the material of the tubing blank to be able to be saturated with the adhesive. The tubing blank can however also be realised multilayer.

In this case, in addition to a textile structure, an additional layer, possibly with a thermoplastic plastics material extruded on the textile structure, can be provided. In the fitting position, shown in FIG. 1b, of the tubing, this extruded coating would be arranged in the border region between the tubing blank 1a and the barrier layer 1b. A multilayer tubing blank of this type, which contains e.g. a layer formed from a thermoplastic polyurethane elastomer, preferably has a gas permeation<250 ml/(bar d m$^2$). In FIGS. 1a and 1b the barrier layer consists of aluminium. The thickness of the aluminium layer is between 50 and 200 μm. The barrier layer can however also be a composite of a plurality of layers, e.g. the barrier layer can be formed by an aluminium foil coated on one or both sides.

FIG. 1b shows a tubing arrangement or lining formed from tubing 1, which is connected to the entire surface of the inner wall of a pipe or a pipeline 2 by means of an adhesive. The tubing blank 1a is saturated with the adhesive, moreover adhesive is located in the adhesive layer 3. The adhesive layer 3 and the tubing blank 1a saturated with adhesive are not completely nonporous; indeed in places there are largish cavities 6 between the pipe inner wall and the inner circumference of the tubing blank 1a. These cavities cause the bursting effect of traditional tubing, described in the description of prior art in the present application, which occurs when an inner pressure P1 in the flow area 7 of a fluid drops so quickly that pressure compensation from the adhesive layer or the adhesive- saturated tubing blank into the flow area through the tubing wall is no longer possible. The tubing 1 is particularly suitable for inner pressures P1≧,

What is claimed is:

1. A lining for a pipe comprising: a tubing blank and an adhesive for securing the tubing blank to an interior wall of the pipe, including a barrier layer having a permeation of less than 1 ml/(bar d m$^2$) for non-polar gaseous substances and a permeation of less than 0.1 ml/(bar d m$^2$) for polar gaseous substances.

2. The lining of claim 1 wherein the barrier layer exhibits a permeation of between 0.0001 ml/(bar d m$^2$) and 0.01 ml/(bar d m$^2$) for both non-polar and polar gaseous substances.

3. The lining of claim 1 wherein the barrier layer abuts the tubing blank.

4. The lining of claim 1 wherein the tubing blank comprises a textile structure.

5. The lining of claim 4 wherein the textile structure of the tubing blank comprises a woven fabric.

6. The lining of claim 4 wherein the textile structure of the tubing blank comprises a knitted fabric.

7. The lining of claim 4 wherein the textile structure of the tubing blank consists essentially of low diffusion yarns.

8. The lining of claim 7 wherein the low diffusion yarns consist essentially of a material selected from glass fibers and aramid fibers.

9. The lining of claim 4 wherein the adhesive saturates the textile structure.

10. The lining of either of claim 1 or 4 wherein the tubing blank further comprises a thermoplastic layer.

11. The lining of claim 10 wherein the thermoplastic layer consists essentially of at least one material from the group of polyvinyl alcohols and copolymers thereof, liquid crystal polymers, polyamids, polyacrylonitriles, polyvinylidenechlorides, epoxy resins, and organosilicon compounds.

12. The lining of claim 10 wherein the thermoplastic layer includes aluminum particles.

13. The lining of claim 1 wherein the barrier layer consists essentially of an inorganic material.

14. The lining of claim 13 wherein the barrier layer comprises a continuous metal layer.

15. The lining of claim 14 wherein the continuous metal layer consists essentially of at least one material from the group of aluminum, titanium, copper, zinc, nickel, lead, chromium, iron, iron-zinc alloy and lead-tin alloy.

16. The lining of claim 14 wherein the continuous metal layer has a thickness of between 10 μm and 100 μm.

17. The lining of claim 13 wherein the barrier layer consists essentially of a material selected from silicon oxide (SiO$_x$ where x≦2) and aluminum oxide (Al$_2$O$_3$).

18. The lining of claim 1 further comprising a protective layer on an interior surface of the barrier layer.

19. The lining of claim 18 wherein the protective layer consists essentially of at least one material selected from polyurethane, polyester, polyolefin, styrene-butadien copolymer, styrene-ethylene-propylene copolymer and mixtures of polypropylene and cross-linked ethylene-propylene-diene copolymers.

20. The lining of claim 1 wherein the barrier layer is formed at least in part by said adhesive.

21. A method for lining a pipe comprising the steps of:

providing a tubing blank, securing the tubing blank to an interior wall of the pipe with an adhesive, and including a barrier layer having a permeation of less than 1 ml/(bar d m$^2$) for non-polar gaseous substances and a permeation of less than 0.1 ml/(bar d m$^2$) for polar gaseous substances.

22. The method of claim 21 wherein the including step comprises applying the barrier layer to the tubing blank.

23. The method of claim 22 wherein the applying step comprises vacuum depositing the barrier layer on the tubing blank.

24. The method of claim 21 wherein the including step comprises introducing material forming the barrier layer into the tubing blank.

25. The method of claim 22 or 23 wherein the including step comprises applying a metal layer by galvanic means to the tubing blank.

26. The method of claim 24 further comprising the steps of providing a tubular sheath having a sufficiently low gas permeation to form the barrier layer, and drawing the tubing blank over the tubular sheath.

27. The method of claim 22 further comprising the steps of providing a tubular sheath having a sufficiently low gas permeation to form the barrier layer, and pulling the tubing blank into the tubular sheath.

28. The method of claim 22 further comprising the steps of providing a metal foil in strip form having a sufficiently low gas permeation to form the barrier layer, and wrapping the metal foil around the tubing blank.

29. The method of claim 24 further comprising the steps of providing a metal foil in strip form having a sufficiently low gas permeation to form the barrier layer, and wrapping the metal foil over the inner surface of the tubing blank.

30. The method of claim 21 wherein the including step comprises extruding the barrier layer.

31. The method of claim 21 wherein the including step comprises dipping the tubular blank in a material to form the barrier layer.

32. The method of claim 21 wherein the including step comprises coating the tubing blank with a coating with a gas permeation of more than 1 ml/(bar d m$^2$) for polar and non-polar gaseous substances prior to said securing step, and thereafter applying the barrier layer to an inner surface of the tubing blank.

33. The method of claim 32 wherein the applying step comprises spraying the barrier layer on in a liquid state.

34. The method of claim 32 wherein the applying step comprises providing a tubular sheath, placing an adhesive between the tubular sheath an the inner surface of the tubing blank, and pulling the tubular sheath into the tubing blank after the tubing blank is positioned within the pipe, and pressurizing the interior of the tubular sheath to secure the sheath to substantially the entire inner surface of the tubing blank.

35. The method of claim 34 wherein the pulling step comprises using a flexible draw-in tube as a drawing-in aid for installation of the tubular sheath.

36. The method of claim 32 wherein the applying step comprises providing a tubular sheath having a sufficiently low gas permeation to form the barrier layer, placing an adhesive between the tubular sheath an the inner surface of the tubing blank, and inverting the tubular sheath into the tubing blank after the tubing blank is positioned within the pipe.

* * * * *